May 23, 1961     J. C. STEELE     2,985,799
STATIC GROUNDING DEVICE FOR VEHICLES
Filed Feb. 12, 1958
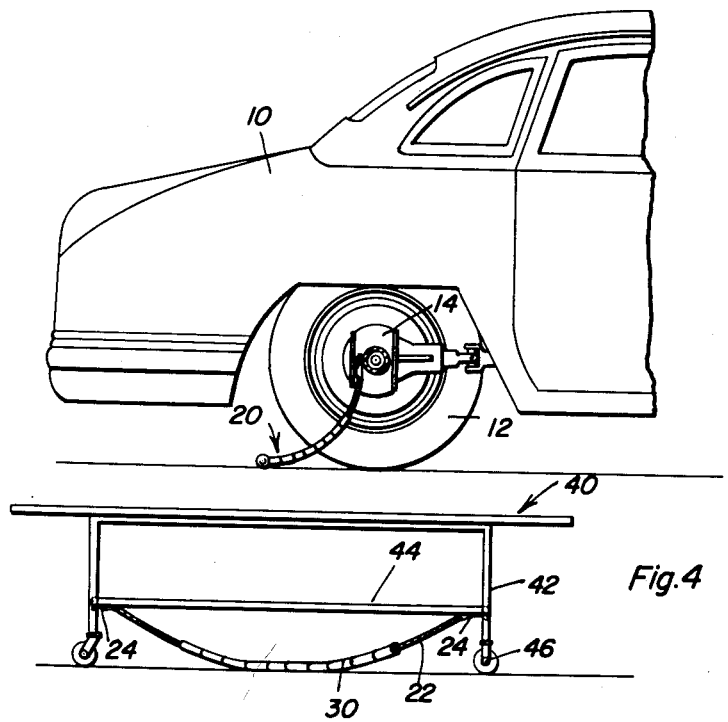
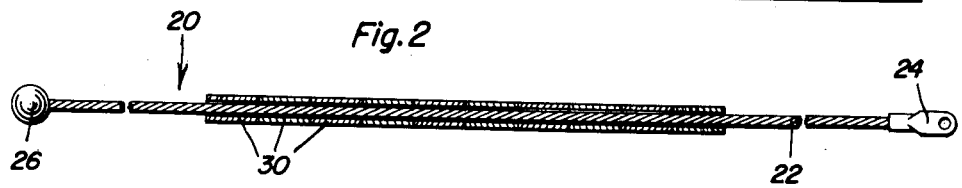
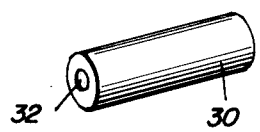
John C. Steele
INVENTOR.

United States Patent Office 2,985,799
Patented May 23, 1961

2,985,799
STATIC GROUNDING DEVICE FOR VEHICLES
John C. Steele, 504 N. Monroe, San Angelo, Tex.
Filed Feb. 12, 1958, Ser. No. 714,896
1 Claim. (Cl. 317—2)

This invention comprises a novel and useful static grounding device for vehicles and more particularly relates to an improved means for effecting a continuous discharge of static from a static collecting portion of the vehicles by grounding the latter.

The principal object of this invention is to provide an improved means for discharging static accumulating upon vehicles of various types.

A further object of the invention is to provide a static dissipating device having a very considerable resistance to wear and attrition as minimizing rusting and corrosion thereof.

Still another object of the invention is to provide a stainless steel rope or a brass wire rope having electrically conducted and static dissipating means thereon which will stiffen and reinforce the rope, will prevent kinking of the same as well as reduce rusting, corrosion or abrasion of the rope during use.

A still further important object of the invention is to provide a static dissipating device as set forth in the foregoing objects which may be readily applied to various types of vehicles for grounding the static collecting portions of the same upon the surface over which the vehicle is to be moved.

A further and more specific object of the invention in accordance with the immediately preceding object is to provide a static dissipating device especially adapted for use with wheeled vehicles such as automotive vehicles, or vehicles such as hospital beds or the like, and in any event will be effective with vehicles of all characters for preventing the discharge of sparks from static accumulations thereon in a dangerous atmosphere.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a portion of an automotive vehicle, parts being broken away and shown in vertical section, and showing the manner in which the static dissipating of this invention may be advantageously applied thereto;

Figure 2 is a view, parts being broken away, and part shown in elevation and part in vertical central section through the form of static dissipator of Figure 1;

Figure 3 is a perspective view of one of the sleeves forming a part of the invention;

Figure 4 is a side elevational view of a second manner of employing the static dissipator, the same being shown secured at its two ends to the supporting means of a hospital bed or the like and with an end portion of the device disposed beneath the bed and in grounded contact with the surface over which the bed is moved; and Figure 5 is a plan view showing the manner in which the second form of the static dissipating device may be secured to a static collecting portion of the support means of a wheeled vehicle such as a hospital bed or the like for dissipating static therefrom.

In the movement of vehicles across surfaces, static charges or collections of static electricity are frequently built-up upon electrically conductive parts of such vehicles. When these charges build up to sufficient potentials, an electric static discharge frequently occurs between the high potential static collection and the surface over which the vehicle moves or to some other electrically conductive surface at a lower potential. When there is present an explosive atmosphere, as for example, the presence of gasolene or other flammable materials attending the use of automotive vehicles, or when the vehicle is in an explosive atmosphere, as for example a hospital bed or other mobile equipment in the ether laden fumes of a hospital, it is obvious that any such sparking creates a serious fire hazard.

It is obvious that an effective remedy for this condition is to provide a ground between the static collecting portions of such vehicles and the surface over which the vehicle passes in order to dissipate the static charges.

However, the provision of conventional static dissipating devices such as chains dragging from a portion of an automotive vehicle and extending to the rear thereof, or similar grounds applied to hospital equipment and the like have not been entirely satisfactory for a number of reasons. Chiefly among these reasons is the rapid deterioration of the static grounding device owing to the effects of attrition, abrasion, rusting or even an inherent stiffness in the grounding device which may cause the same to kink and thus loses effective grounding contact.

The principal aim of the present invention is to provide a grounding device which shall be entirely satisfactory for all of the above-mentoned purposes, and shall substantially obviate the foregoing disadvantages.

Shown in Figure 1 is a portion of an automotive vehecle designated by the numeral 10 and which has supporting wheels 12, together with a metallic framework, not shown, constituting a part of the static collecting portion thereof, and with which the rear axle assembly 14 is electrically connected. Indicated generally by the numeral 20 is a suitable form of static ground or static dissipator which may be conveniently applied to the axle 14 of the vehicle.

Referring to Figure 2 it will be seen that the device 20 conveniently comprises an elongated flexible element of electrically conductive material as at 22, which element may conveniently comprise a stainless steel or brass rope, or any other pliable wire-like or rod-like member. At one end of the same there is provided a connector 24 whereby the device may be bolted to the axle housing or the like when applied to an automotive vehicle, and at the other end there is secured thereto and bonded thereto a ball 26 adapted to drag upon the ground and constitute a good electrical ground for the device.

Loosely received upon the element 22 are a plurality of metallic sleeves 30 of brass or other suitable electrically conductive material, and which if desired may be a material highly resistant to abrasion, corrosion and the like.

The sleeves 30 are provided with axial bores 32 therethrough in order to slidably receive therein in a snug relation the elongated electrically conductive member 22. The sleeves are of sufficient length and the bores of sufficient size to permit relative rotation of the sleeves upon the cable 22 or longitudinal movement thereon under the influence of gravity, the frictional drag of the sleeves against the ground or the like, or by any other means. These sleeves serve as stiffeners to prevent kinking of the rope or cable 22, constitute wear-resisting elements therefor and to some extent may constitute an anti-friction means as the sleeves rest upon and roll upon the ground, thereby reducing wear or abrasion upon the cable.

Although Figure 1 illustrates only the ball 26 engaging the ground or surface over which the vehicle moves, it is obvious that the cable may be of sufficient length to cause at least some of the sleeve 30 thereon to likewise have contact with the ground.

It will thus be seen that the device provides an effective means for dissipating static charges accumulating upon the frame or other portions of an automotive vehicle, and for grounding the same; minimizes kinking or buckling of the metallic cable or wire 22, and thereby insures and enhances a good grounding effect of the cable with the ground for dissipating static electrical charges.

In Figures 4 and 5, there is disclosed a further manner in which the static dissipating device may be applied to a vehicle. Thus, shown at 40 is a piece of hospital or surgical equipment such as a bed or the like, the same having supporting means such as the legs 42, suitable cross-bracing 44, and supporting wheels 46. In applying the device to this particular use, a somewhat different form of static dissipator is provided. In this instance, the same cable 22 having the sleeves 30 thereon is provided. However, both ends of this cable are provided with the connectors 24 which extend to diagonally opposite portions of the supporting structure as will be apparent from Figure 5, the cable being of sufficient length to cause its mid-portion to rest upon the ground as shown in Figure 4. Thus, the static dissipating device is disposed entirely beneath the bed or apparatus to thus avoid the presenting of any projecting portion which might obstruct the movement of persons about the device. By its diagonal disposition, it is evident that upon movement of the device 40 there will be imparted at least some rotation to the sleeves 30 thereby resisting friction, while an adequate and continuous ground is established for dissipating electrical charges accumulated by the framework of the device.

It is evident that the static dissipating device in accordance with this invention may be applied to all types of vehicles. For example, although the supporting means of the vehicle has been shown in the embodiments of Figures 1 and 4 as consisting of wheels, it is obvious that the same principles may be applied to a sled or similar device having runners and to any other supporting means.

The foregoing is considered as illustrative only of the principles of the invention. Further, since numerous modifications and changes will readily occur to those skilled in the art it is not desired to limit the invention to the exact construction and operation shown and described, and accordingly all suitable modifications and equivalents may be resorted to, falling within the scope of the invention as claimed.

What is claimed as new is as follows:

The combination of a vehicle and a static grounding device comprising an elongated flexible member of an electrically conductive material connected at both ends thereof to spaced points on said vehicle and extending in a direction oblique to the normal direction of travel of the vehicle, the length of said member being greater than the distance between said spaced points whereby the intermediate portion of the member is free to sag and engage the ground, and a plurality of electrically conductive tubular sleeves rotatably and slidably positioned in end to end relation on the ground engaging intermediate portion of said member.

References Cited in the file of this patent

UNITED STATES PATENTS

| | | |
|---|---|---|
| 2,023,321 | Gutman | Dec. 3, 1935 |
| 2,524,163 | Criss | Oct. 3, 1950 |
| 2,753,491 | Legge | July 3, 1956 |

FOREIGN PATENTS

| | | |
|---|---|---|
| 3,909 | Great Britain | Oct. 23, 1877 |
| 746,925 | France | June 8, 1933 |